(12) United States Patent
Hedberg et al.

(10) Patent No.: US 6,266,320 B1
(45) Date of Patent: Jul. 24, 2001

(54) AMPLITUDE LIMITATION IN CDMA SYSTEM

(75) Inventors: Bo Hedberg, Kista; Bo Hermansson, Farsta; Christian Nyström, Sollentuna, all of (SE); Georg Frank, Nurnber (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/056,651

(22) Filed: Apr. 8, 1998

(51) Int. Cl.[7] .................................................. H04J 11/00
(52) U.S. Cl. .......................... 370/206; 370/335; 370/342; 370/203
(58) Field of Search ..................... 370/208, 206, 370/209, 283, 298, 320, 335, 342, 462, 480, 484, 527, 142, 143, 203, 252, 392, 210, 330; 375/240.84, 298, 130; 381/14

(56) References Cited

U.S. PATENT DOCUMENTS

| | | | |
|---|---|---|---|
| 3,586,781 | * 6/1971 | Jones | 179/15 |
| 4,763,326 | * 8/1988 | Krick | 370/110.4 |
| 5,295,153 | * 3/1994 | Gudmundson | 375/1 |
| 5,341,397 | * 8/1994 | Gudmundson | 375/1 |
| 5,377,183 | * 12/1994 | Dent | 370/18 |
| 5,621,762 | * 4/1997 | Miller et al. | 375/298 |
| 5,668,806 | * 9/1997 | Arai et al. | 370/342 |
| 5,751,705 | * 5/1998 | Sato | 370/335 |

FOREIGN PATENT DOCUMENTS

| | | | |
|---|---|---|---|
| 0 797 323 A1 | 2/1996 | (EP) | H04H/1/00 |
| 0797323 A1 | * 2/1997 | (EP) | H04H/1/00 |
| WO 96/36144 | * 11/1996 | (WO) | H04J/11/00 |
| WO 96/38944 | * 12/1996 | (WO) | H04J/13/04 |

OTHER PUBLICATIONS

The Figure 1 of the Admitted Prior Art, Apr. 1998.*

* cited by examiner

Primary Examiner—Dang Ton
Assistant Examiner—Anthony Ton
(74) Attorney, Agent, or Firm—Burns, Doane, Swecker & Mathis, L.L.P.

(57) ABSTRACT

In a telecommunications network that employs a CDMA scheme, the amplitude associated with each independent CDMA carrier is digitally limited, thereby limiting the peak-to-average power ratio. This, in turn, is accomplished by measuring the instantaneous amplitude for the in-phase and quadrature signals that make up each CDMA carrier, deriving a maximum amplitude based on the instantaneous amplitude measurements, and then deriving one or more scaling factors based, in-part, on maximum amplitude. The one or more scaling factors are then applied to the in-phase and quadrature signals, which are subsequently filtered, combined and modulated by a corresponding CDMA carrier frequency.

28 Claims, 6 Drawing Sheets

AMPLITUDE LIMITATION IN CDMA SYSTEM

BACKGROUND

The present invention relates to cellular radio telecommunications systems, and more particularly to cellular radio telecommunications systems that employ a code division multiple access (CDMA) scheme.

Cellular radio telecommunications systems employ one or more channel access schemes. One well-known channel access scheme is the code division multiple access (CDMA) scheme. CDMA is well-known in the art. Unlike other channel access schemes (e.g., time division or frequency division multiple access), a number of different traffic channel signals are simultaneously transmitted in such a way that they overlap in both the time domain and the frequency domain.

In order to distinguish each traffic channel signal from the other traffic channel signals, each traffic channel signal is encoded with one or more unique spreading codes, as is well-known in the art. By modulating each of the traffic channel signals with a spreading code, the sampling rate (i.e., the "chip rate") may be substantially increased in accordance with a spreading factor. For example, each traffic channel signal is modulated in accordance with a digital modulation scheme, e.g., a quadrature amplitude modulation (QAM) or a phase shift keying (PSK) technique. Consequently, an in-phase and quadrature component signal is produced for each traffic channel signal. QAM and PSK are well known in the art. The in-phase and quadrature component signals associated with each of the traffic channels are then encoded using a unique spreading code sequence. The resulting in-phase and quadrature component signal pairs are sampled (i.e., at the chip rate) and individually weighted. The in-phase and quadrature component signals are eventually combined to form a composite in-phase signal and a composite quadrature signal. The composite in-phase signal and the composite quadrature signal are then separately filtered by a low-pass, pulse shaping filter. Subsequent to filtering, the composite in-phase signal and the composite quadrature signal are modulated by a cosine-carrier and a sine-carrier respectively and combined into a single, multicode CDMA signal. The single, multicode CDMA signal is then upconverted by a carrier frequency and the signal power associated with the CDMA signal is boosted by a high power amplifier prior to transmission. At a receiving unit, the baseband signal associated with each of the traffic channel signals is extracted from the CDMA signal by demodulating and decoding the CDMA signal using the carrier frequency and the various spreading codes. Furthermore, it will be understood that in a typical cellular telecommunications system, the transmission source may, for example, be a high power base station, and the receiving entity may, for example, be a mobile station (i.e., a mobile telephone).

When there is an especially large number of traffic channel signals, it is sometimes preferable to generate two or more CDMA signals, wherein each of the two or more CDMA signals is upconverted by its own unique CDMA carrier frequency. The two or more upconverted CDMA signals are then independently amplified by a corresponding high power amplifier prior to transmission, or alternatively, the two or more upconverted CDMA signals are combined into a single, CDMA signal, which is then amplified by a single, high power amplifier prior to transmission.

As one skilled in the art will readily appreciate, CDMA substantially increases system bandwidth, which in turn, increases the network's traffic handling capacity as a whole. In addition, combining independent CDMA signals into a single CDMA signal, as described above, is advantageous in that a single high power amplifier is required rather than a separate high power amplifier for each independent CDMA signal. This is advantageous because high power amplifiers are expensive, and employing one high power amplifier in place of many will result in a substantial cost savings.

Despite the advantages associated with CDMA, combining multiple traffic channel signals and/or independent CDMA signals, in general, significantly increases the peak-to-average power ratio associated with the resulting CDMA signal. More specifically, the peak-to-average power ratio for a CDMA signal can be determined in accordance with the following relationship:

$$PR_{PTA} = PR_F + 10 * \log(N)$$

wherein $PR_{PTA}$ represents the peak-to-average power ratio of the corresponding composite signal, $PR_F$ represents the power ratio of the low-pass, pulse shaping filter and N represents the number of traffic channels which make up the CDMA signal.

The problem associated with large peak-to-average power ratios is that it diminishes the efficiency of the high power amplifier in the transmitter. Efficiency, as one skilled in the art will readily understand, is measured in terms of the amount of output power (i.e., Pmean) divided by the amount of input power (i.e., Pdc+Ppeak). As Ppeak (i.e., peak power) increases relative to Pmean, the efficiency of the high power amplifier decreases.

One possible solution is to simply limit or clip the amplitude (i.e., Ppeak) of the CDMA signal. Unfortunately, this is likely to result in the generation of intermodulation products and/or spectral distortions. Intermodulation products and/or spectral distortions are, in turn, likely to cause interference between the various traffic channel signals. Accordingly, this is not a preferred solution.

Another possible solution is to design a more complex high power amplifier, one that can tolerate and more efficiently amplify CDMA signals that exhibit large peak-to-average ratios. However, this too is not a preferred solution as the cost of high power amplifiers are generally proportional to complexity. Accordingly, this solution would result in driving up the cost of the telecommunications device that houses the high power amplifier.

U.S. Pat. No. 5,621,762 ("Miller et al.") offers yet another possible solution for the peak-to-average power ratio problem, that is to limit the peak-to-average power ratio before the soon-to-be transmitted telecommunications signal is filtered and subsequently amplified. More specifically, Miller describes a peak power suppression device for reducing the peak-to-average power ratio of a single code sequence at the input of the high power amplifier. The peak power suppression device employs a digital signal processor (DSP) which receives the single code sequence, maps the code sequence onto a symbol constellation diagram, predicts an expected response from the pulse shaping filter and limits the amplitudes appearing on the symbol constellation diagram in accordance with the expected response of the pulse shaping filter.

The primary problem with the solution offered in Miller is that peak power suppression device is designed for a non-CDMA application. Therefore, the peak power suppression device described therein is incapable of coping with the specific characteristics associated with CDMA, such as, high data bit rates, multiple traffic channel signals and/or multi-code sequences, and multiple CDMA carrier signals. For example,
the peak power suppression device described in
Miller is inherently slow, as evidenced by the fact that it
employs a DSP, and by the fact that the DSP has the time
necessary to execute a pulse shaping filter prediction algorithm. Therefore, a need exists for a telecommunications
signal amplitude limitation device that is capable of limiting
the peak-to-average power ratio of a telecommunications
signal before it is filtered and subsequently amplified, and
additionally, is capable of handling significantly higher data
bit rates, multiple code sequences, and multiple CDMA
carrier signals.

SUMMARY

In view of the problems identified above, it is an object of
the present invention to provide the ability to effectively
reduce the peak-to-average power ratio for a CDMA signal
in such a way that the efficiency of the high power amplifier
in the transmitter is not degraded.

It is another object of the present invention to reduce the
peak-to-average power for a CDMA signal without generating intermodulation products and/or spectral distortions.

It is yet another object of the present invention to limit the
peak-to-average power ratio when there are two or more
independent CDMA carrier signals.

In accordance with one aspect of the invention, the
foregoing and other objects are achieved by a method and/or
apparatus that limits the amplitude of a complex code
division multiple access (CDMA) signal. the method and/or
apparatus comprises means for measuring an instantaneous
amplitude for each of a plurality of digitally encoded
sequences and means for generating a maximum amplitude
as a function of the instantaneous amplitude measurements.
The method and/or apparatus also includes means for deriving an amplitude scaling factor as a function of the maximum amplitude and means for applying the amplitude
scaling factor to each of the plurality of digitally encoded
sequences. A CDMA signal is then generated based upon
each of the amplitude limited, digitally encoded sequences.

In accordance with another aspect of the invention, the
foregoing and other objects are achieved by a method and/or
apparatus for limiting the peak-to-average power ratio of a
complex code division multiple access (CDMA) signal. The
method and/or apparatus according to this alternative aspect
of the invention comprises means for measuring the instantaneous amplitude for a first and a second composite
in-phase signal and a first and a second composite quadrature signal, wherein the first and the second composite
in-phase signal and the first and the second composite
quadrature signal are a function of a first and a second set of
digitally encoded traffic channel signals. The method and/or
apparatus also includes means for generating an amplitude
scaling factor for the first and the second composite in-phase
signal and the first and the second composite quadrature
signal as a function of the measured instantaneous amplitudes associated with the first and the second composite
in-phase and quadrature signals. Once the amplitude scaling
factor for the first and the second composite in-phase signal
and the first and the second quadrature signal, the method
and/or apparatus employs means for applying the amplitude
scaling factor for the first and the second composite in-phase
signal and the first and the second composite quadrature
signal to the first and the second composite in-phase signal
and the first and the second composite quadrature signal
respectively. A CDMA signal is then generated based on the
first and the second in-phase and quadrature signals.

DETAILED DESCRIPTION

Figure 1:
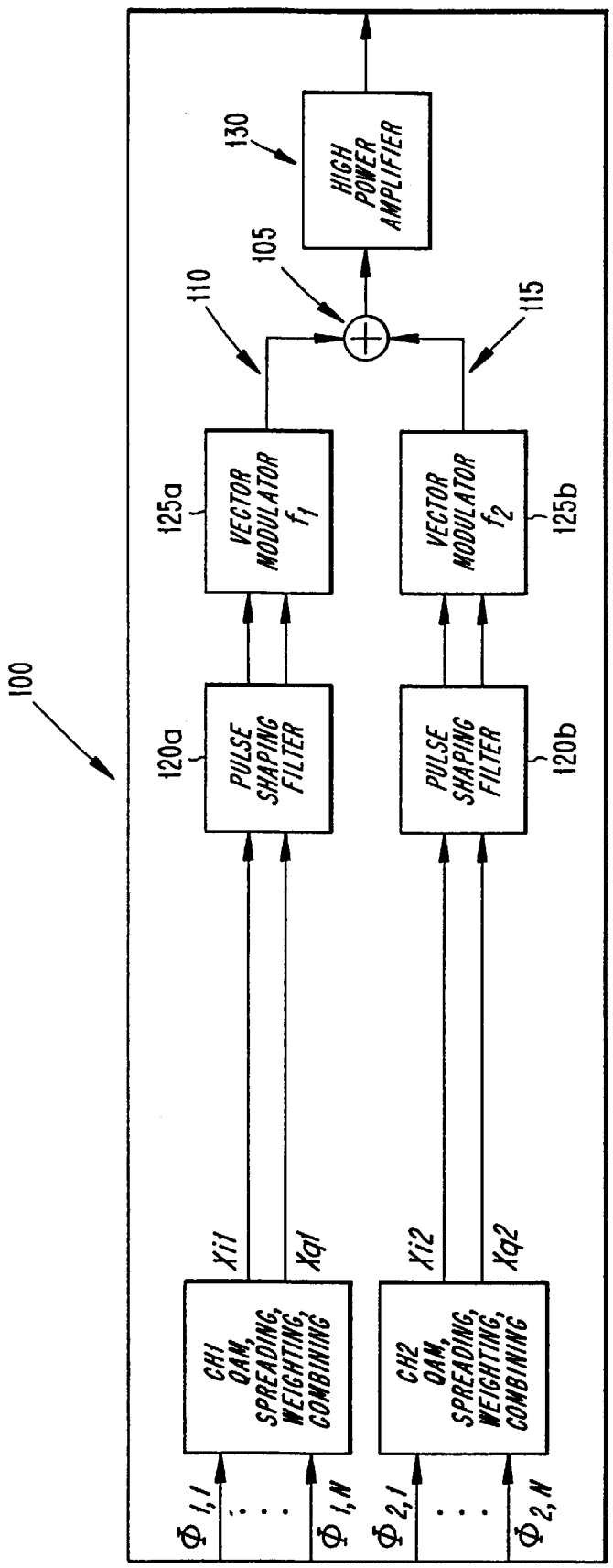
FIG. 1 shows a technique for generating and amplifying
a CDMA signal in accordance with the prior art.

The various features of the invention will now be
described with respect to the figures, in which like parts are
identified with the same reference characters.

FIG. 1 is a schematic diagram that depicts a prior technique for generating a CDMA signal 105. As illustrated, the
CDMA signal 105 is generated by combining, two (or more)
independent CDMA signals 110 and 115. In accordance with
this prior technique, each traffic channel signal from a first
set of digital traffic channel signals $\Phi 1,1,\ldots \Phi 1,N$ and each
traffic channel signal from a second set of digital traffic
channel signals $\Phi 2, 1, \ldots \Phi 2,N$ is modulated using a
quadrature amplitude modulation (QAM) technique. This
results in the generation of an in-phase and quadrature signal
pair for each of the traffic channel signals. Each of the
in-phase signals associated with the first set of traffic channel
signals is then encoded using a unique spreading code,
individually weighted and combined with other in-phase
signals, thereby generating a first composite in-phase signal
Xi1, and each of the quadrature signals associated with the
first set of traffic channel signals is likewise encoded,
weighted and combined, thereby generating a first composite quadrature signal Xq1. Similarly, each of the in-phase
signals associated with the second set of traffic channel
signals is encoded, weighted and combined, thereby generating a second composite in-phase signal Xi2, and each of
the quadrature signals associated with the second set of
traffic channel signals is encoded, weighted and combined,
thereby generating a second composite quadrature signal
Xq2. As illustrated in FIG. 1, the composite in-phase signal
Xii and the composite quadrature signals Xq1 are then
forwarded to a first pulse shaping filter 120a. Similarly, the
composite in-phase signal Xi2 and the composite quadrature
signals Xq2 are forwarded to a second pulse shaping filter
120b. Next, the filtered signals are forwarded to a first and
a second vector modulator 125a and 125b. The vector
modulator 125a modulates the composite in-phase signal
Xi1 by a cosine-carrier with a frequency $f_1$ and it modulates
the composite quadrature signal Xq1 by a sine-carrier also
having a frequency $f_1$. The vector modulator 125a then
combines the modulated, composite in-phase signal Xi1
with the modulated, composite quadrature signal Xq1,
thereby generating the first independent CDMA signal 110.
Simultaneously, the vector modulator 125b modulates the
composite in-phase signal Xi2 by a cosine-carrier with a
frequency $f_2$ and it modulates the composite quadrature
signal Xq2 by a sine-carrier also having a of frequency $f_2$.
The vector modulator 125b then combines the modulated,
composite in-phase signal Xi2 with the modulated, composite quadrature signal Xq2, thereby generating the second
independent CDMA signal 115. The two independent
CDMA signals 110 and 115 are then combined to form the
CDMA signal 105, which is then forwarded to a high power
amplifier 130 prior to transmission.

As explained above, the peak-to-average power ratio associated with the CDMA signal 105 increases as the number of traffic channel signals Φ increases, and an increase in the peak-to-average power ratio, in turn, reduces the efficiency of the high power amplifier 130. In addition, if an attempt is made to limit or clip the amplitude of the CDMA signal 105 in the high power amplifier 130 or in the transmitter (not shown) which houses the high power amplifier 130, a considerable amount of intermodulation and/or spectral distortion is likely to result.

Figure 2:
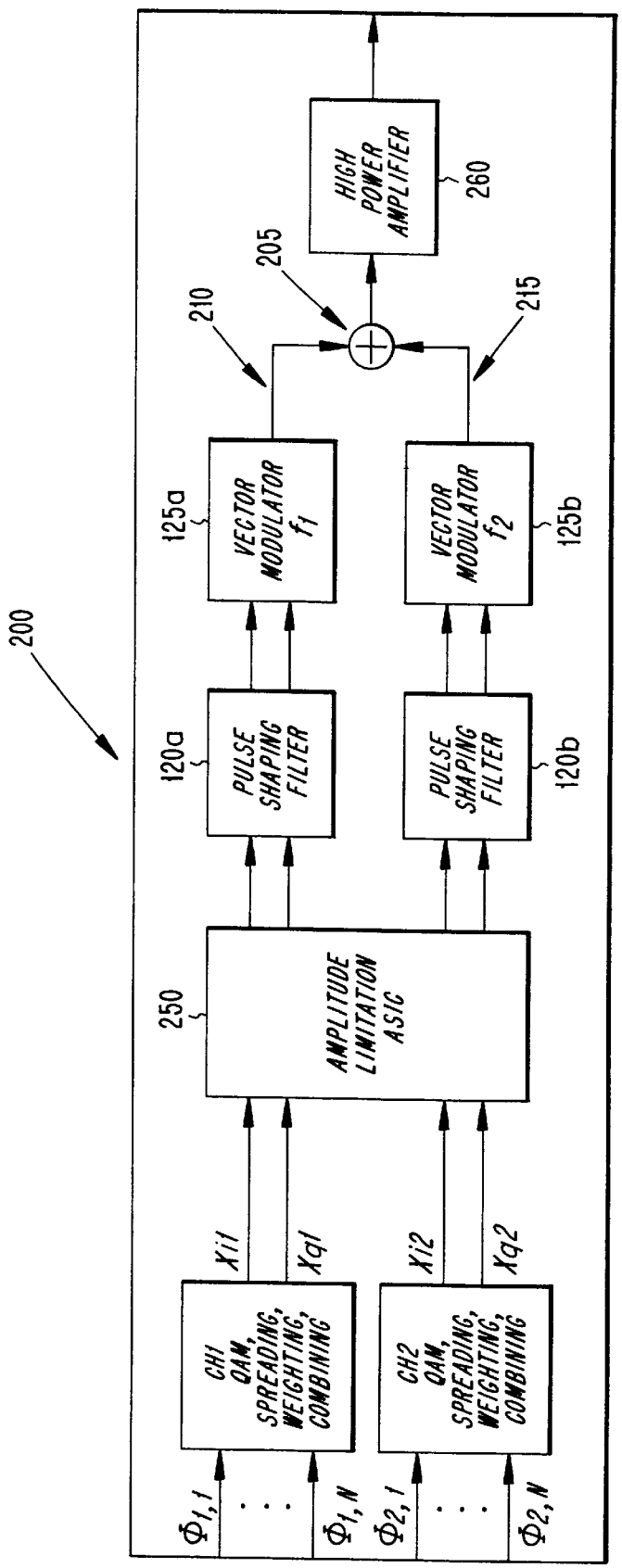
FIG. 2 shows a technique for generating and amplifying
a CDMA signal in accordance with a preferred embodiment
of the present invention.

FIG. 2 is a schematic diagram that depicts a technique 200 for generating a composite CDMA signal 205 in accordance with a preferred embodiment of the present invention. This technique is similar to the technique depicted in FIG. 1, in that the preferred embodiment also involves encoding and combining each of a first and a second plurality of digital traffic channel signals Φ1,1,...Φ1,N Φ2,1,...Φ2,N into a first composite in-phase signal Xi1, a first composite quadrature signal Xq1, a second composite in-phase signal Xi2 and a second composite quadrature signal Xq2. However, unlike the prior technique depicted in FIG. 1, the composite in-phase and quadrature signals Xi1, Xq1, Xi2 and Xq2 are forwarded to an amplitude limitation, application specific integrated circuit (ASIC) 250.

The ASIC 250 is a high speed hardware device that is capable of limiting the amplitude of the composite in-phase and quadrature signals Xi1, Xq1, Xi2 and Xq2 before the signals are forwarded to the pulse shaping filters 120a and 120b. The ASIC 250 will be described in greater detail below. The now filtered and amplitude adjusted in-phase and quadrature signals Xi1 and Xq1 are then modulated by a CDMA carrier with frequency $f_1$ and combined to form the first independent CDMA signal 210. Similarly, the now filtered and amplitude adjusted in-phase and quadrature signals Xi2 and Xq2 are modulated by a CDMA carrier with frequency $f_2$ and combined to form the second independent CDMA signal 215. The two independent CDMA carrier signals 210 and 215 are then upconverted and combined to form the CDMA signal 205. The signal power of the CDMA signal 205 is then boosted by the high power amplifier 260 prior to transmission.

Figure 3:
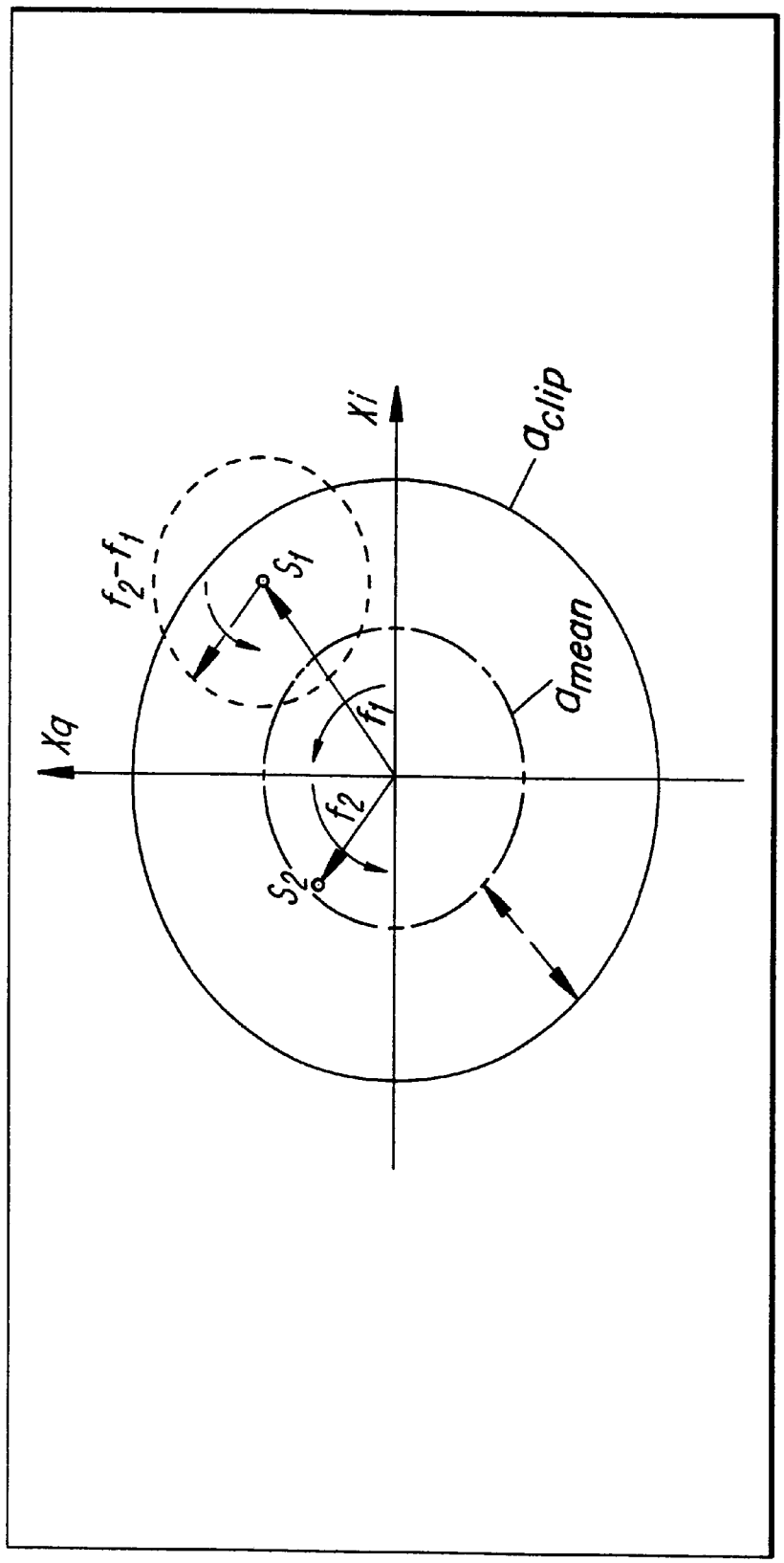
FIG. 3 is a symbol constellation diagram.

In accordance with the preferred embodiment of the present invention, limiting the amplitude of a CDMA signal, for example CDMA signal 205, first requires the determination of a maximum amplitude a1, associated with the first independent CDMA signal 210, and a maximum amplitude a2, associated with the second independent CDMA signal 215. These determinations are better understood with reference to the symbol constellation diagram illustrated in FIG. 3, wherein S1 represents the amplitude and phase corresponding with the first CDMA signal 210 and S2 represents the amplitude and phase corresponding with the second CDMA signal 215. The maximum amplitudes a1 and a2 are then determined in accordance with the following relationships:

$$a1=|S1|=(Xi1^2+Xq1^2)^{1/2} \qquad (1)$$

$$a2=|S2|=(Xi2^2+Xq2^2)^{1/2} \qquad (2)$$

wherein Xi1, Xq1, Xi2 and Xq2 represent the instantaneous values of the composite in-phase and quadrature signals described above. However, one skilled in the art will understand that a1 and a2 could be approximated using equations other than equations (1) and (2) above.

Once the maximum amplitudes a1 and a2 have been determined, a1 and a2 are used to calculate a scaling factor "s". In accordance with the preferred embodiment, the scaling factor "s" is determined by the following relationships:

$$s=a_{clip}/a (\text{if } a>a_{clip}) \qquad (3)$$

$$s=1 (\text{if } a \leq a_{clip}) \qquad (4)$$

wherein $a_{clip}$ is defined as the maximum allowable amplitude value realized at the input of the pulse shaping filters 120a and 120b, and "a" represents a maximum overall amplitude. More specifically, the maximum overall amplitude "a" is given by the following relationship.

$$a=a1+a2 \qquad (5)$$

The scaling factor "s" is then used to limit the instantaneous amplitudes associated with the composite in-phase and the composite quadrature signals Xi1, Xq1, Xi2 and Xq2.

Figure 4:
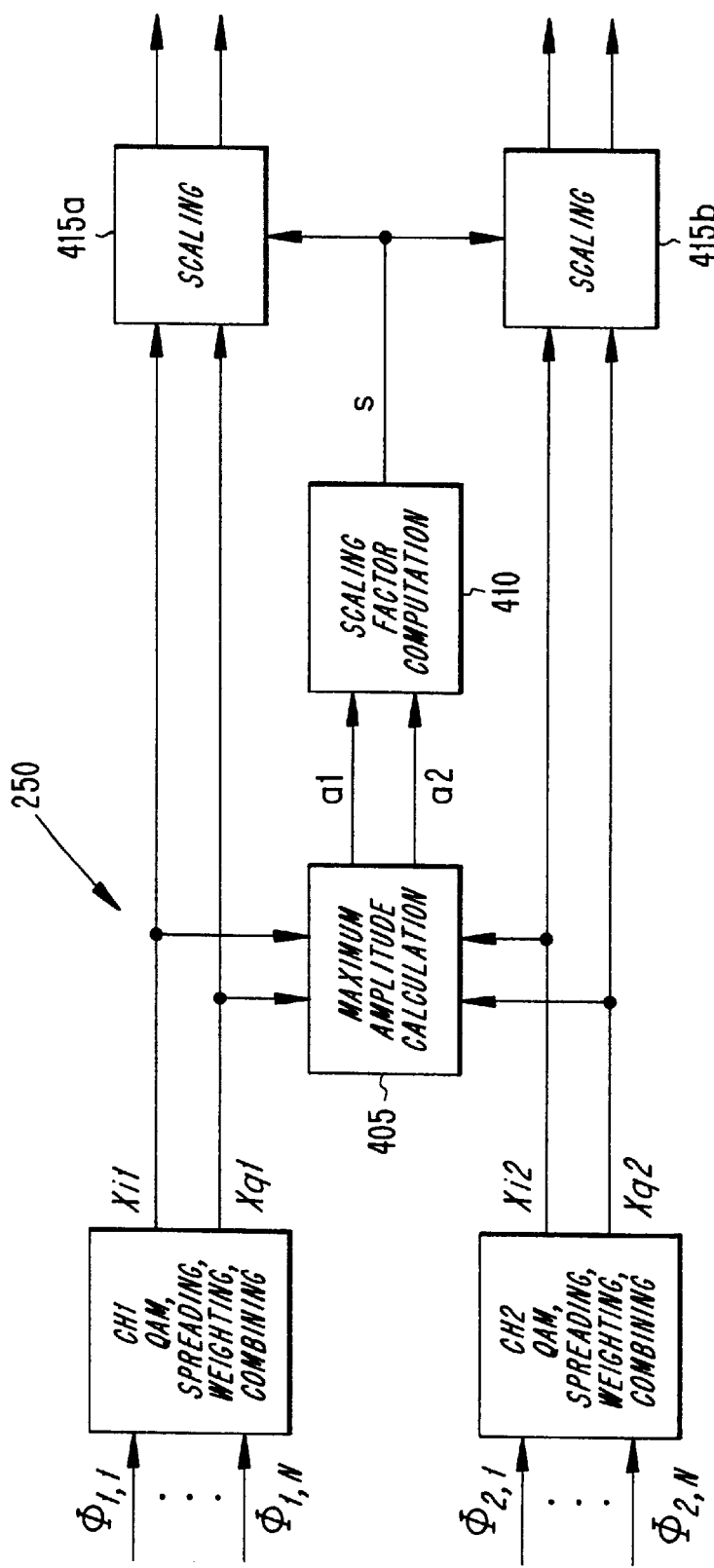
FIG. 4 illustrates the amplitude limitation ASIC in accordance with a preferred embodiment of the present invention.

FIG. 4 illustrates, in greater detail, the functional components associated with ASIC 250 which are needed to execute the preferred amplitude limitation technique described above. More specifically, ASIC 250 contains a maximum amplitude calculation module 405. The maximum amplitude calculation module 405 represents a high speed digital circuit that is capable of making the necessary measurements and computations to solve equations (1) and (2) above. ASIC 250 then forwards a1 and a2 to a scaling factor computation module 410. The scaling factor computation module 410 represents a high speed digital circuit that is capable of performing the necessary computations to solve equations (3), (4) and (5) above.

Once the scaling factor "s" is determined, the scaling factor calculation module 410 forwards the scaling factor "s" to scaling modules 415a and 415b. The scaling module 415a represents a high speed digital circuit that is capable of applying (e.g., multiplying) the scaling factor "s" to both the composite in-phase signal Xi1 and the composite quadrature signal Xq1. Similarly, the scaling module 415b represents a high speed digital circuit that is capable of applying the scaling factor "s" to both the composite in-phase signal Xi2 and the composite quadrature signal Xq2. Once the in-phase and quadrature signals Xi1, Xq1, Xi2 and Xq2 have been scaled, the ASIC 250 forwards the amplitude limited signals to the pulse shaping filters 120a and 120b, as illustrated in FIG. 2.

Figure 5:
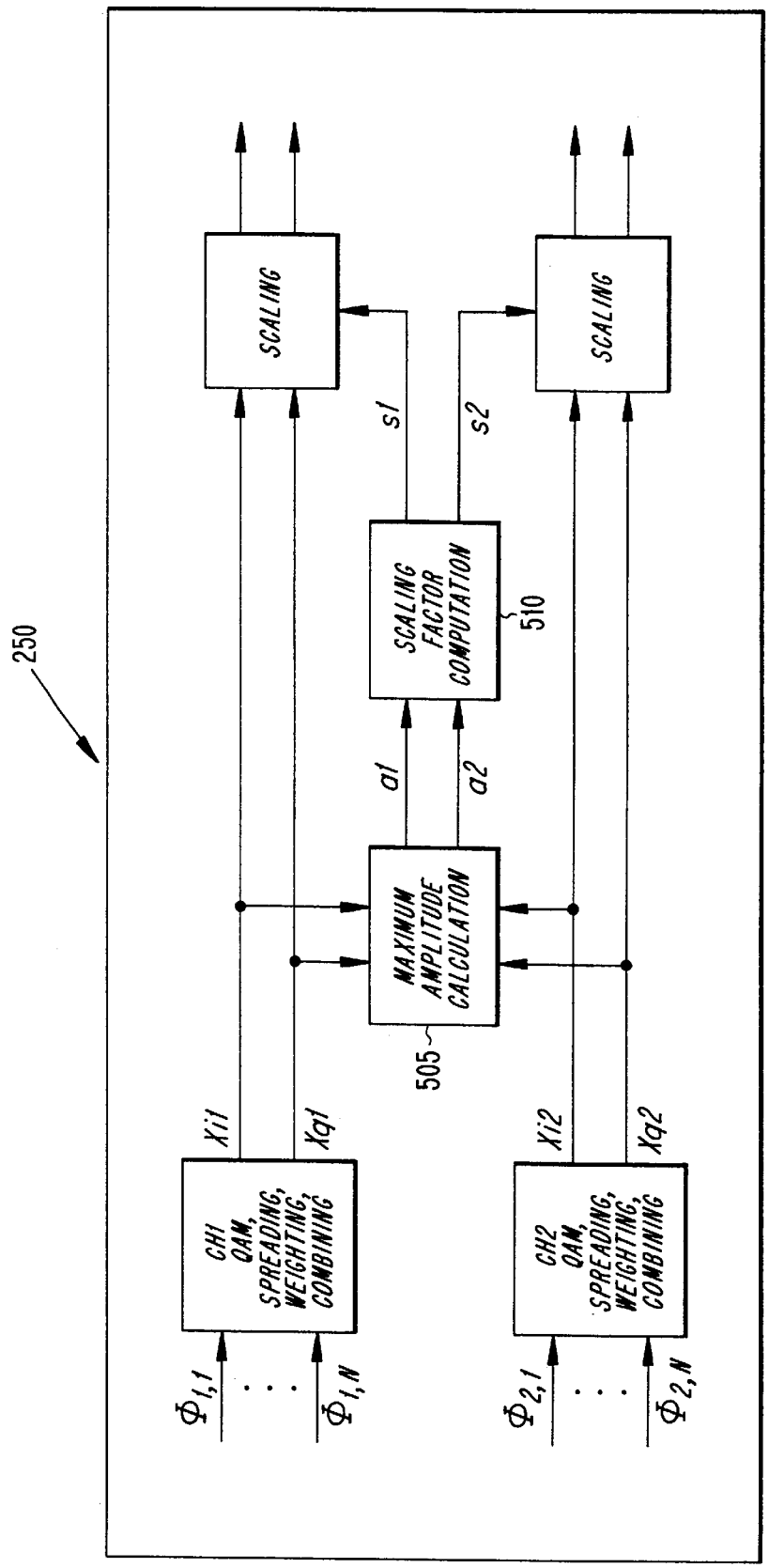
FIG. 5 illustrates the amplitude limitation ASIC in accordance with an alternative embodiment of the present invention.

FIG. 5 illustrates an alternative embodiment for the ASIC 250. In accordance with this alternative embodiment, separate scaling factors s1 and s2 are computed by the scaling factor computation module 510, wherein scaling factor s1 is utilized for independently adjusting the instantaneous amplitude of the in-phase and quadrature signals Xi1 and Xq1, and the scaling factor s2 is utilized for independently adjusting the instantaneous amplitude of the in-phase and quadrature signals Xi2 and Xq2. More specifically, s1 and s2 may be determined in accordance with the following equations:

$$s1=(a_{clip}/a1)*w_1 \qquad (6)$$

$$s2=(a_{clip}/a2)*w_2 \qquad (7)$$

wherein w1 and w2 represent a first and a second weighting factor for independently adjusting the scaling factors s1 and s2 respectively.

The alternative technique illustrated in FIG. 5 may be employed when there is a significant disparity between the signal power levels associated with the traffic channel signals of CH1 in FIG. 2 as compared to the signal power levels associated with the traffic channel signals of CH2. If, for example, the signal power levels associated with the traffic channel signals of CH1 are significantly lower than those associated with the traffic channel signals of CH2, it may be appropriate to scale only the instantaneous amplitudes for the composite in-phase and quadrature signals Xi2 and Xq2. This can effectively be accomplished by setting the weighting factor w2 to the value "1", and by setting the weighting factor w1 such that s2 approximates the value "1". Of course, it will be understood that weighting factors w1 and w2 could be set to any value that is deemed appropriate to scale the instantaneous amplitudes for the composite in-phase and quadrature signals Xi1, Xq1, Xi2 and Xq2.

In accordance with yet another alternative embodiment, the instantaneous amplitude samples associated with the composite in-phase and quadrature signal samples (e.g., Xi1, Xq1, Xi2, Xq2) may be limited or clipped if the amplitude sample exceeds a predetermined maximum value. In order to prevent a corresponding decrease in the average power level of the composite CDMA signal, and hence, an undesirable increase in the $PR_{PTA}$ of the composite CDMA signal, this alternative embodiment generates a scaling factor which is then used to increase the amplitude of one or more subsequent, composite in-phase and quadrature signal samples, wherein the increase in amplitude over the one or more subsequent samples is proportional to the decrease in amplitude of the sample that was previously clipped. Of course, adjusting the amplitude of these subsequent samples compensates for the instantaneous amplitude sample that was previously clipped. Moreover, one skilled in the art will appreciate that lower bit error rates can be achieved by modestly increasing the amplitude of several, subsequent, composite in-phase and quadrature signal samples rather than dramatically increasing the amplitude of a single, subsequent sample. This is especially true if increasing the amplitude of the single, subsequent sample results in that amplitude exceeding the aforementioned predetermined maximum value.

Figure 6:
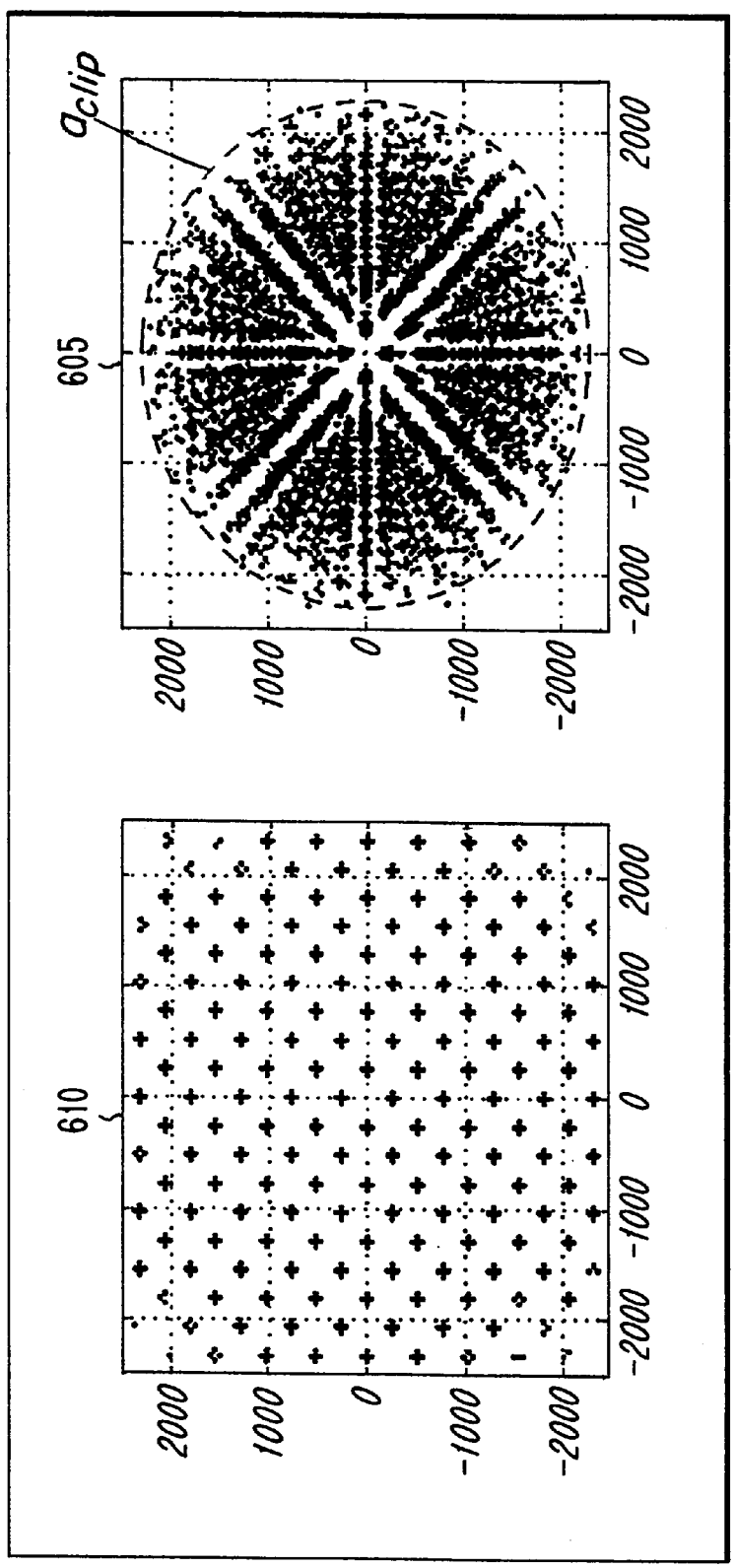
FIG. 6 shows symbol constellation diagrams.

FIG. 6 illustrates two symbol constellations diagrams 605 and 610. The symbol constellation diagram 605 shows the location of the symbols (i.e., instantaneous amplitudes) associated with a CDMA signal (e.g., CDMA signal 205) when digital amplitude limitation, in accordance with the preferred embodiment of the present invention, is employed. The symbol constellation diagram 610 shows the location of the symbols associated with the CDMA signal when digital amplitude limitation is not employed. As one skilled in the art will readily appreciate, the transmitted symbols are all located within a circular region whose radius is defined by $a_{clip}$, when digital amplitude limitation is employed. However, the transmitted symbols are not necessarily located within this circular region when digital amplitude limitation is not employed. The latter case is likely to result in larger peak-to-average power ratios and, as explained above, poor high power amplifier efficiency.

The present invention has now been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus for limiting the amplitude of a complex code division multiple access (CDMA) signal comprising:

means for measuring an instantaneous amplitude for each of a plurality of digitally encoded sequences;

means for generating a maximum amplitude as a function of the instantaneous amplitude measurements;

means for deriving an amplitude scaling factor as a function of the maximum amplitude;

means for applying the amplitude scaling factor to each of the plurality of digitally encoded sequences; and means for generating a CDMA signal based upon each of the amplitude limited, digitally encoded sequences.

2. An apparatus in accordance with claim 1, wherein said means for deriving the amplitude scaling factor is also a function of a clipping amplitude.

3. An apparatus in accordance with claim 2, wherein the clipping amplitude is a function of a pulse shaping filter.

4. An apparatus in accordance with claim 1, wherein said means for generating a CDMA signal based upon each of the amplitude limited, digitally encoded sequences comprises:

means for filtering each of the amplitude limited, digitally encoded sequences; and means for combining the amplitude limited, digitally encoded sequences.

5. An apparatus in accordance with claim 4 further comprising:

means for modulating the amplitude limited, digitally encoded sequences.

6. An apparatus for limiting the peak-to-average power ratio of a complex code division multiple access (CDMA) signal comprising:

means for measuring instantaneous amplitude for a first composite in-phase signal and a first composite quadrature signal, wherein the first composite in-phase signal and the first composite quadrature signal are a function of a first set of digitally encoded traffic channel signals;

means for measuring instantaneous amplitude for a second composite in-phase signal and a second composite quadrature signal, wherein the second composite in-phase signal and the second composite quadrature signal are a function of a second set of digitally encoded traffic channel signals;

means for generating an amplitude scaling factor for the first composite in-phase signal and the first composite quadrature signal as a function of the measured instantaneous amplitudes associated with the first composite in-phase and quadrature signals and the second composite in-phase and quadrature signals;

means for generating an amplitude scaling factor for the second composite in-phase signal and the second composite quadrature signal as a function of the measured instantaneous amplitudes associated with the first composite in-phase and quadrature signals and the second composite in-phase and quadrature signals;

means for applying the amplitude scaling factor for the first composite in-phase signal and the first composite quadrature signal to the first composite in-phase signal and the first composite quadrature signal;

means for applying the amplitude scaling factor for the second composite in-phase signal and the second composite quadrature signal to the second composite in-phase signal and the second composite quadrature signal; and means for generating a CDMA signal based on the first and the second in-phase and quadrature signals.

7. The apparatus in accordance with claim 6 further comprising:

means for generating a maximum amplitude as a function of the measured instantaneous amplitudes associated with the first composite and the second composite in-phase and quadrature signals, wherein said means for generating the amplitude scaling factor for the first composite in-phase signal and the first composite quadrature signal and said means for generating the amplitude scaling factor for the second composite in-phase signal and the second composite quadrature signal include means for generating the amplitude scaling factors as a function of the maximum amplitude.

8. The apparatus of claim 7, wherein the amplitude scaling factor generated for the first composite in-phase signal and the first composite quadrature signal is equivalent to the amplitude scaling factor generated for the second composite in-phase signal and the second composite quadrature signal.

9. The apparatus of claim 6 further comprising:

means for applying a first weighting factor to the amplitude scaling factor generated for the first composite in-phase signal and the first composite quadrature signal; and means for applying a second weighting factor to the amplitude scaling factor generated for the second composite in-phase signal and the second composite quadrature signal.

10. The apparatus of claim 9 further comprising:

means for adjusting the first and the second weighting factors such that the amplitude scaling factor generated for the first composite in-phase signal and the first composite quadrature signal is equivalent to said amplitude scaling factor generated for the second composite in-phase signal and the second composite quadrature signal.

11. The apparatus of claim 9 further comprising:

means for adjusting the first weighting factor such that the amplitude scaling factor generated for the first composite in-phase signal and the first composite quadrature signal is a function of a signal power level representative of the first set of digitally encoded traffic channel signals; and means for adjusting the second weighting factor, independent of the means for adjusting the first weighting factor, such that the amplitude scaling factor generated for the second composite in-phase signal and the second composite quadrature signal is a function of a signal power level representative of the second set of digitally encoded traffic channel signals.

12. The apparatus in accordance with claim 6 further comprising:

means for maintaining average power of the CDMA signal by applying an amplitude scaling factor to one or more composite in-phase and composite quadrature signal samples, wherein the amplitude of the one or more composite in-phase and composite quadrature signal samples is increased to compensate for a corresponding decrease in amplitude of a previous composite in-phase and composite quadrature signal sample.

13. The apparatus of claim 6 further comprising:

means for filtering the first composite in-phase signal and the first composite quadrature signal;

means for filtering the second composite in-phase signal and the second composite quadrature signal;

means for modulating the filtered, first composite in-phase signal by a first cosine-carrier and the filtered, first composite quadrature signal by a first sine-carrier, wherein the first sine-carrier has a same frequency as the first cosine-carrier;

means for modulating the filtered, second composite in-phase signal by a second cosine-carrier and the filtered, second composite quadrature signal by a second sine-carrier, wherein the second sine-carrier has a same frequency as the second cosine-carrier;

means for combining the first filtered, composite in-phase signal with the first filtered, composite quadrature signal, thereby generating a first independent CDMA signal;

means for combining the second filtered, composite in-phase signal with the second filtered, composite quadrature signal, thereby generating a second independent CDMA signal;

means for upconverting the first independent CDMA signal with a first CDMA carrier frequency; and means for upconverting the second independent CDMA signal with a second CDMA carrier frequency.

14. The apparatus in accordance with claim 13, wherein said means for generating a CDMA signal comprises:

means for combining the first independent CDMA signal with the second independent CDMA signal.

15. A method for limiting the amplitude of a complex code division multiple access (CDMA) signal comprising the steps of:

measuring an instantaneous amplitude for each of a plurality of digitally encoded sequences;

generating a maximum amplitude as a function of the instantaneous amplitude measurements;

deriving an amplitude scaling factor as a function of the maximum amplitude;

applying the amplitude scaling factor to each of the plurality of digitally encoded sequences; and generating a CDMA signal based upon each of the amplitude limited, digitally encoded sequences.

16. A method in accordance with claim 15, wherein said step of deriving the amplitude scaling factor is also a function of a clipping amplitude.

17. A method in accordance with claim 16, wherein the clipping amplitude is a function of a pulse shaping filter.

18. A method in accordance with claim 15, wherein said step of generating a CDMA signal based upon each of the amplitude limited, digitally encoded sequences comprises the steps of:

filtering each of the amplitude limited, digitally encoded sequences; and combining the amplitude limited, digitally encoded sequences.

19. A method in accordance with claim 18 further comprising the step of:

modulating the amplitude limited, digitally encoded sequences.

20. A method for limiting the peak-to-average power ratio of a complex code division multiple access (CDMA) signal comprising the steps of:

measuring instantaneous amplitude for a first composite in-phase signal and a first composite quadrature signal, wherein the first composite in-phase signal and the first composite quadrature signal are a function of a first set of digitally encoded traffic channel signals;

measuring instantaneous amplitude for a second composite in-phase signal and a second composite quadrature signal, wherein the second composite in-phase signal and the second composite quadrature signal are a function of a second set of digitally encoded traffic channel signals;

generating an amplitude scaling factor for the first composite in-phase signal and the first composite quadrature signal as a function of the measured instantaneous amplitudes associated with the first composite in-phase and quadrature signals and the second in-phase and quadrature signals;

generating an amplitude scaling factor for the second composite in-phase signal and the second composite quadrature signal as a function of the measured instantaneous amplitudes associated with the first composite in-phase and quadrature signals and the second composite in-phase and quadrature signals;

applying the amplitude scaling factor for the first composite in-phase signal and the first composite quadrature signal to the first composite in-phase signal and the first composite quadrature signal;

applying the amplitude scaling factor for the second composite in-phase signal and the second composite quadrature signal to the second composite in-phase signal and the second composite quadrature signal; and generating a CDMA signal based on the first and the second in-phase and quadrature signals.

21. A method in accordance with claim 20 further comprising the steps of:

generating a maximum amplitude as a function of the measured instantaneous amplitudes associated with the first composite and the second composite in-phase and quadrature signals, wherein the amplitude scaling factor for the first composite in-phase and quadrature signals and amplitude scaling factor for the second composite in-phase and quadrature signals are also generated as a function of the maximum amplitude.

22. A method in accordance with claim 21, wherein the amplitude scaling factor generated for the first composite in-phase signal and the first composite quadrature signal is equivalent to the amplitude scaling factor generated for the second composite in-phase signal and the second composite quadrature signal.

23. A method in accordance with claim 20 further comprising the steps of:

applying a first weighting factor to the amplitude scaling factor generated for the first composite in-phase signal and the first composite quadrature signal; and applying a second weighting factor to the amplitude scaling factor generated for the second composite in-phase signal and the second composite quadrature signal.

24. A method in accordance with claim 23 further comprising the step of:

adjusting the first and the second weighting factors such that the amplitude scaling factor generated for the first composite in-phase signal and the first composite quadrature signal is equivalent to said amplitude scaling factor generated for the second composite in-phase signal and the second composite quadrature signal.

25. A method in accordance with claim 23 further comprising the steps of:

adjusting the first weighting factor such that the amplitude scaling factor generated for the first composite in-phase signal and the first composite quadrature signal is a function of a signal power level representative of the first set of digitally encoded traffic channel signals; and adjusting the second weighting factor, independent of the means for adjusting the first weighting factor, such that the amplitude scaling factor generated for the second composite in-phase signal and the second composite quadrature signal is a function of a signal power level representative of the second set of digitally encoded traffic channel signals.

26. A method in accordance with claim 20 further comprising the step of:

maintaining average power of the CDMA signal by applying the amplitude scaling factor to one or more composite in-phase and composite quadrature signal samples, wherein the amplitude of the one or more composite in-phase and composite quadrature signal samples is increased to compensate for a corresponding decrease in amplitude of a previous composite in-phase and composite quadrature signal sample.

27. A method in accordance with claim 20 further comprising the steps of:

filtering the first composite in-phase signal and the first composite quadrature signal;

filtering the second composite in-phase signal and the second composite quadrature signal;

modulating the filtered, first composite in-phase signal by a first cosine-carrier and the filtered, first composite quadrature signal by a first sine-carrier, wherein the first sine-carrier has a same frequency as the first cosine-carrier;

modulating the filtered, second composite in-phase signal by a second cosine-carrier and the filtered, second composite quadrature signal by a second sine-carrier, wherein the second sine-carrier has a same frequency as the second cosine-carrier;

combining the first filtered, composite in-phase signal with the first filtered, composite quadrature signal, thereby generating a first independent CDMA signal;

combining the second filtered, composite in-phase signal with the second filtered, composite quadrature signal, thereby generating a second independent CDMA signal;

upconverting the first independent CDMA signal with a first CDMA carrier frequency; and upconverting the second independent CDMA signal with a second CDMA carrier frequency.

28. A method in accordance with claim 27, wherein said step of generating a CDMA signal comprises the step of:

combining the first independent CDMA signal with the second independent CDMA signal.

* * * * *